US009553710B2

(12) United States Patent
Hwang et al.

(10) Patent No.: US 9,553,710 B2
(45) Date of Patent: Jan. 24, 2017

(54) METHODS AND AN APPARATUS FOR CARRIER AGGREGATION

(71) Applicant: ELECTRONICS AND TELECOMMUNICATIONS RESEARCH INSTITUTE, Daejeon (KR)

(72) Inventors: Sung Hyun Hwang, Daejeon (KR); Sung Jin Yoo, Daejeon (KR); Jung Sun Um, Daejeon (KR); Byung Jang Jeong, Daejeon (KR); Jae Ick Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 53 days.

(21) Appl. No.: 14/524,448

(22) Filed: Oct. 27, 2014

(65) Prior Publication Data
US 2015/0117393 A1 Apr. 30, 2015

(30) Foreign Application Priority Data

Oct. 31, 2013 (KR) ........................ 10-2013-0131314
Mar. 4, 2014 (KR) ........................ 10-2014-0025638

(51) Int. Cl.
*H04W 72/08* (2009.01)
*H04L 5/00* (2006.01)

(52) U.S. Cl.
CPC ............. *H04L 5/0062* (2013.01); *H04L 5/001* (2013.01)

(58) Field of Classification Search
CPC ........................... H04L 12/865; H04L 12/891
(Continued)

(56) References Cited

U.S. PATENT DOCUMENTS 8,259,782 B2 * 9/2012 Wu ...................... H04B 17/345
370/342
2003/0039222 A1 * 2/2003 Bae ...................... H04B 17/336
370/320

(Continued)

FOREIGN PATENT DOCUMENTS

KR 1020110102231 A 9/2011
KR 1020130004935 A 1/2013

OTHER PUBLICATIONS

"Autonomous Component Carrier Selection: Interference Management in Local Area Environments for LTE-Advanced", Luis G. U. Garcia, IEEE Communications Magazine, Sep. 2009, p. 110.

*Primary Examiner* — Omar Ghowrwal
*Assistant Examiner* — Angel Brockman
(74) *Attorney, Agent, or Firm* — Ladas & Parry LLP

(57) ABSTRACT

Provided herein is a method and apparatus for heterogeneous carrier aggregation, the method including calculating interferences regarding a plurality of interference paths between an adjacent cell and serving cell; determining weighted values for the plurality of interference paths in the serving cell; calculating an accumulated value (accumulated margin or accumulated interference) regarding the plurality of interference paths based on the weighted values in the serving cell; determining a component carrier to be used in the carrier aggregation based on the accumulated value calculated in the serving cell; and performing the carrier aggregation based on the component carrier determined.

10 Claims, 5 Drawing Sheets

(58) Field of Classification Search
USPC .......................................................... 370/330
See application file for complete search history.

(56) References Cited

U.S. PATENT DOCUMENTS

| | | | |
|---|---|---|---|
| 2011/0141932 A1* | 6/2011 | Iwao | H04L 45/02 370/252 |
| 2012/0008503 A1* | 1/2012 | Qiu | H04L 43/0882 370/238 |
| 2012/0236731 A1* | 9/2012 | Beaudin | H04W 72/082 370/248 |
| 2013/0051264 A1 | 2/2013 | Wang et al. | |
| 2014/0302854 A1 | 10/2014 | Wei | |

* cited by examiner

- 3G/4G(500)
- LSA(510)
- TVWS(520)
- ISM(530)

METHODS AND AN APPARATUS FOR CARRIER AGGREGATION

CROSS-REFERENCE TO RELATED APPLICATION

The present application claims priority to Korean patent application numbers 10-2013-0131314, filed on Oct. 31, 2013 and 10-2014-0025638, filed on Mar. 4, 2014, the entire disclosure of which is incorporated herein in its entirety by reference.

BACKGROUND

Field of Invention

Various embodiments of the present invention relate to wireless communication, and more particularly, to a method and apparatus for determining a component carrier for heterogeneous carrier aggregation.

Description of Related Art

With the rapid diffusion of smart phones, mobile communication services that used to be mostly about providing voice services have now changed their focus to data-centric services providing wireless multimedia contents. Thus, mobile data traffic is increasing rapidly. Especially, since 2011 when the number of smart phone terminals provided reached 20 million units, various mobile environments are being provided where web contents can be used freely. Furthermore, as tablet PCs such as iPads and galaxy tabs are also increasing at a rapid pace, the growth of wireless traffic is accelerating even more. However, the rapid growth of mobile data traffic that is centered-around smart devices is slowing down the speed of wireless internet significantly, making it difficult to even access wireless internet.

Various communication technologies are being developed to accommodate the rapidly increasing mobile traffic. For example, for 3GPP LTE-Advanced, various technologies have been developed, such as the multiple antenna based MIMO technique for increasing the transmission capacity of base stations, ICIC (Inter-Cell Interference Coordination) which is a technology for an efficient control of interference to increase the capacity in edge of cells, CoMPT™which is a coordinate transmission and reception technology, device-to-device communication technology for distributing traffic load in base stations, and cognitive radio technology for using idle TV bands (UHF bands).

Transmitting and receiving data using a broadband is one way of satisfying the data transmission speed which is one of the requirements of the IMT-Advanced technology. Accordingly, 3GPP designated the maximum bandwidth of LTE-A to 100 MHz. However, since it is difficult to allocate a frequency bandwidth of 100 MHz in limited wireless frequency resources, CA (carrier aggregation) technology was introduced. CA technology is a 'communication technology of aggregating different frequency bands at the same time to create a broadband effect'.

SUMMARY

A first purpose of various embodiments of the present invention is to provide a method for determining a component carrier to be used in carrier aggregation.

A second purpose of various embodiments of the present invention is to provide an apparatus for determining a component carrier to be used in carrier aggregation.

According to an embodiment of the present invention, there is provided a carrier aggregation method including calculating interferences regarding a plurality of interference paths between an adjacent cell and serving cell; determining weighted values for the plurality of interference paths in the serving cell; calculating an accumulated value (accumulated margin or accumulated interference) regarding the plurality of interference paths based on the weighted values in the serving cell; determining a component carrier to be used in the carrier aggregation based on the accumulated value calculated in the serving cell; and performing the carrier aggregation based on the component carrier determined.

The weighted values may be determined such that a largest weighted value is applied to an interference that a low priority apparatus gives to a high priority apparatus, followed by an interference that a high priority apparatus gives to a high priority apparatus, followed by an interference that a low priority apparatus gives to a low priority apparatus, followed by an interference that a high priority apparatus gives to a low priority apparatus.

The sizes of the weighted values may be determined according to math formula:

$$w_{in2} \geq w_{in4} \geq w_{in1} \geq w_{in3},$$

$w_{in1}$ being a weighted value to be applied to an interference that the low priority apparatus of the serving cell receives from the low priority apparatus of the adjacent cell, $w_{in2}$ being a weighted value to be applied to an interference that the high priority apparatus of the serving cell receives from the low priority apparatus of the adjacent cell, $w_{in3}$ being a weighted value to be applied to an interference that the low priority apparatus of the serving cell receives from the high priority apparatus of the adjacent cell, and $w_{in4}$ being a weighted value to be applied to an interference that the high priority apparatus of the serving cell receives from the high priority apparatus of the adjacent cell.

Sizes of the weighted values may be determined according to math formula:

$$w_{out2} \geq w_{out4} \geq w_{out1} \geq w_{out3},$$

$w_{out1}$ being a weighted value to be applied to an interference that the low priority apparatus of the serving cell gives to the low priority apparatus of the adjacent cell, $w_{out2}$ being a weighted value to be applied to an interference that the low priority apparatus of the serving cell gives to the high priority apparatus of the adjacent cell, $w_{out3}$ being a weighted value to be applied to an interference that the high priority apparatus of the serving cell gives to the low priority apparatus of the adjacent cell, and $w_{out4}$ being a weighted value to be applied to an interference that the high priority apparatus of the serving cell gives to the high priority apparatus of the adjacent cell.

According to an embodiment of the present invention, there is provided a base station configured to perform carrier aggregation, the base station including an interference substance calculator configured to calculate interferences regarding a plurality of interference paths between an adjacent cell and serving cell; a weighted value determiner configured to determine weighted values for accumulating the interferences regarding the plurality of interference paths; an accumulated value calculator configured to accumulate the interferences regarding the plurality of interference paths based on the weighted values and to calculate an accumulated value; a frequency band determiner configured to determine a component carrier to be used in the carrier aggregation based on the accumulated value; and a processor configured to perform the carrier aggregation based on the component carrier determined.

The weighted values may be determined such that a largest weighted value is applied to an interference that a low priority apparatus gives to a high priority apparatus, followed by an interference that a high priority apparatus gives to a high priority apparatus, followed by an interference that a low priority apparatus gives to a low priority apparatus, followed by an interference that a high priority apparatus gives to a low priority apparatus.

Sizes of the weighted values may be determined according to math formula:

$$w_{in2} \geq w_{in4} \geq w_{in1} \geq w_{in3},$$

$w_{in1}$ being a weighted value to be applied to an interference that the low priority apparatus of the serving cell receives from the low priority apparatus of the adjacent cell, $w_{in2}$ being a weighted value to be applied to an interference that the high priority apparatus of the serving cell receives from the low priority apparatus of the adjacent cell, $w_{in3}$ being a weighted value to be applied to an interference that the low priority apparatus of the serving cell receives from the high priority apparatus of the adjacent cell, and $w_{in4}$ being a weighted value to be applied to an interference that the high priority apparatus of the serving cell receives from the high priority apparatus of the adjacent cell.

Sizes of the weighted values may be determined according to math formula:

$$w_{out2} \geq w_{out4} \geq w_{out1} \geq w_{out3},$$

$w_{out1}$ being a weighted value to be applied to an interference that the low priority apparatus of the serving cell gives to the low priority apparatus of the adjacent cell, $w_{out2}$ being a weighted value to be applied to an interference that the low priority apparatus of the serving cell gives to the high priority apparatus of the adjacent cell, $w_{out3}$ being a weighted value to be applied to an interference that the high priority apparatus of the serving cell gives to the low priority apparatus of the adjacent cell, and $w_{out4}$ being a weighted value to be applied to an interference that the high priority apparatus of the serving cell gives to the high priority apparatus of the adjacent cell.

As aforementioned, in a method and apparatus for determining a component carrier to be used in carrier aggregation according to the various embodiments of the present invention, an accumulated interference is used in a component carrier selection algorithm, and thus it is possible to perform carrier aggregation in comprehensive consideration of the total amount of the interference coming into a serving cell and the interference going out to an adjacent cell. Furthermore, according to the present invention, by applying a weighting factor based on the usage circumstance of heterogeneous carriers of the serving cell and the adjacent interfering cell, it is possible to perform carrier aggregation in consideration of not only the quantity of interference that used to be considered in conventional methods but also the quality (or characteristics) of interference.

BRIEF DESCRIPTION OF THE DRAWINGS

The above and other features and advantages of the present invention will become more apparent to those of ordinary skill in the art by describing in detail embodiments with reference to the attached drawings in which.

DETAILED DESCRIPTION

Figure 1:
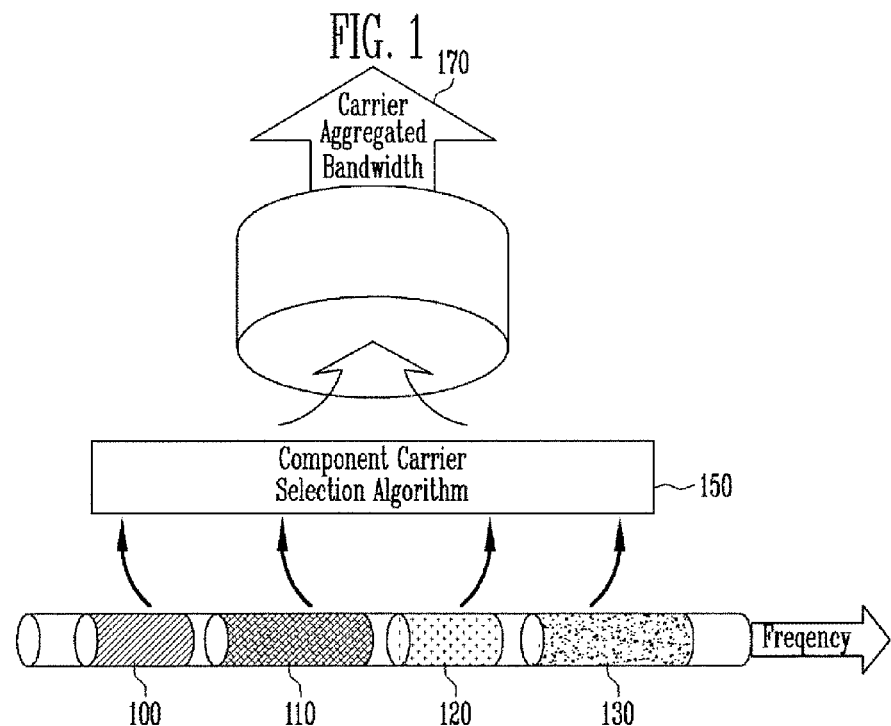
FIG. 1 is a conceptual view of a heterogeneous carrier aggregation method.

Hereinafter, embodiments will be described in greater detail with reference to the accompanying drawings. Embodiments are described herein with reference to cross-sectional illustrates that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present invention. Furthermore, 'and/or' may include any one of or a combination of the components mentioned.

Furthermore, 'connected/accessed' represents that one component is directly connected or accessed to another component or indirectly connected or accessed through another component.

In this specification, a singular form may include a plural form as long as it is not specifically mentioned in a sentence. Furthermore, 'include/comprise' or 'including/comprising' used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

A UE (User Equipment) may be stationary or movable, and may be called by other terms such as MS (mobile station), MT (mobile terminal), UT (user terminal), SS (subscriber station), wireless device, PDA (personal digital assistant), wireless modem, and handheld device.

A base station refers to a fixed station that communicates with a User Equipment, and may be called by other terms such as eNB (evolved-NodeB), BTS (Base Transceiver System), and Access Point etc.

Hereinbelow, in an embodiment of the present invention, the terms UE and base station will be used for convenience.

FIG. 1 is a conceptual view of a heterogeneous carrier aggregation method.

The demand for broadband transmission is increasing in mobile communication and wireless communication markets. And carrier aggregation is being widely used as a technology to respond to such demands for broadband transmission. 3GPP LTE-Advanced Release 10 is capable of supporting up to 100 MHz bandwidth by aggregating five carriers each having a bandwidth of 20 MHz. IEEE 802.11ac standard is capable of supporting up to 160 MHz bandwidth by aggregating two carriers each having a bandwidth of 80 MHz. These standards define technologies of aggregating homogeneous bands (or homogeneous carriers) having frequency bands defined to be within the frequency band defined by the standards. However, as frequency sharing technology is actively being studied recently, there is a rising interest in a technology of providing a broadband by aggregating not only homogeneous carriers (or homogeneous bands) but also heterogeneous carriers (or heterogeneous bands).

Referring to FIG. 1, there may be carriers (heterogeneous carriers) having different frequency bands, such as licensed bands (for example, LTE (Long Term Evolution) bands) 110, TVWS (television white space) 100, ISM (industrial scientific and medical) bands 120, and new shared bands (for example, LSA (licensed shared access)) 130. By aggregating component carriers selected from carriers having different frequency bands using a component carrier selection algorithm 150, it is possible to embody a broadband.

Each of the different frequency bandwidths may be set to one carrier aggregated bandwidth 170 based on the component carrier selection algorithm 150. Hereinbelow, component carriers having bands of the same characteristics with one another will be called homogeneous carriers. For example, homogeneous carriers may be carriers of which a licensed band, unlicensed band, or shared band are not mixed when aggregated. On the other hand, carriers having different band characteristics may be called heterogeneous carriers. For example, heterogeneous carriers may be carriers of which a licensed band, unlicensed band, or shared band are mixed when aggregated.

Figure 2:
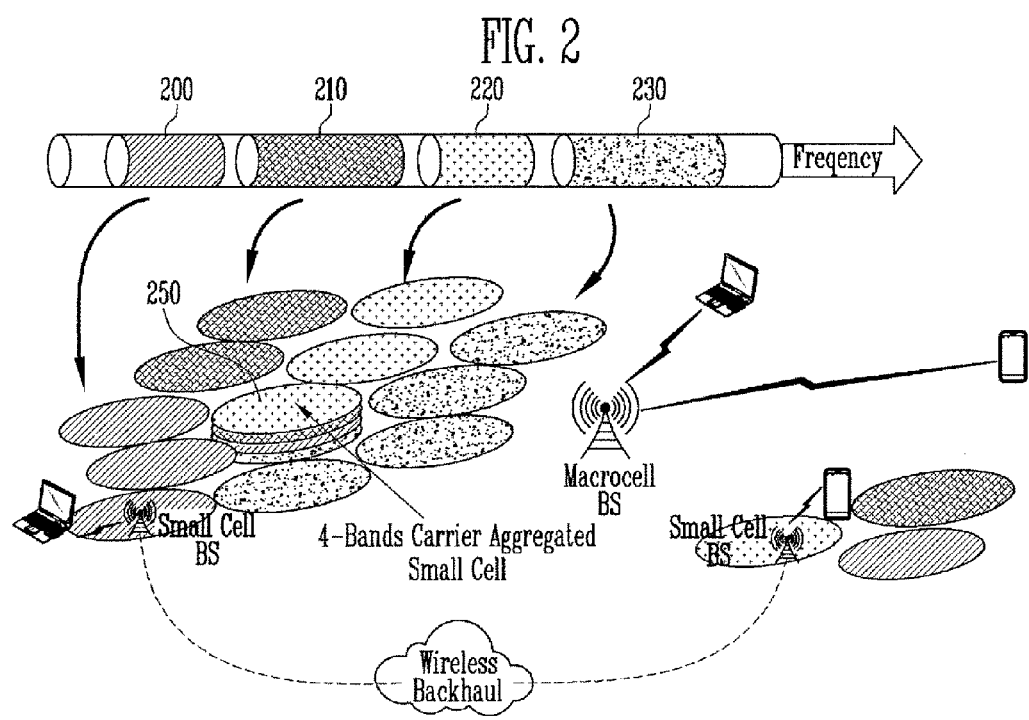
FIG. 2 is a conceptual view of cells using heterogeneous carrier aggregation.

FIG. 2 is a conceptual view of performing carrier aggregation based on heterogeneous carriers.

Referring to FIG. 2, cells are illustrated that are embodied based on different frequency bands such as a TVWS, licensed band, ISM band, and new shared band etc.

Each cell may be embodied based on a homogeneous frequency band. As such, cells may be embodied based on a homogeneous frequency band, but certain cells may be embodied to transmit and receive data through heterogeneous carriers aggregated through carrier aggregation.

For example, in a case where a primary component carrier of a serving cell exists in a high priority (for example, LTE supported band) 210, a heterogeneous frequency band set based on carrier aggregation may be a frequency band having different characteristics from licensed hands such as a TVMS 200, ISM band 220, and new shared band 230.

Small cells that exist in macro cells may need a broadband for data off-loading, in which case small cells may transmit and receive data using a heterogeneous frequency band set based on carrier aggregation.

Figure 3:
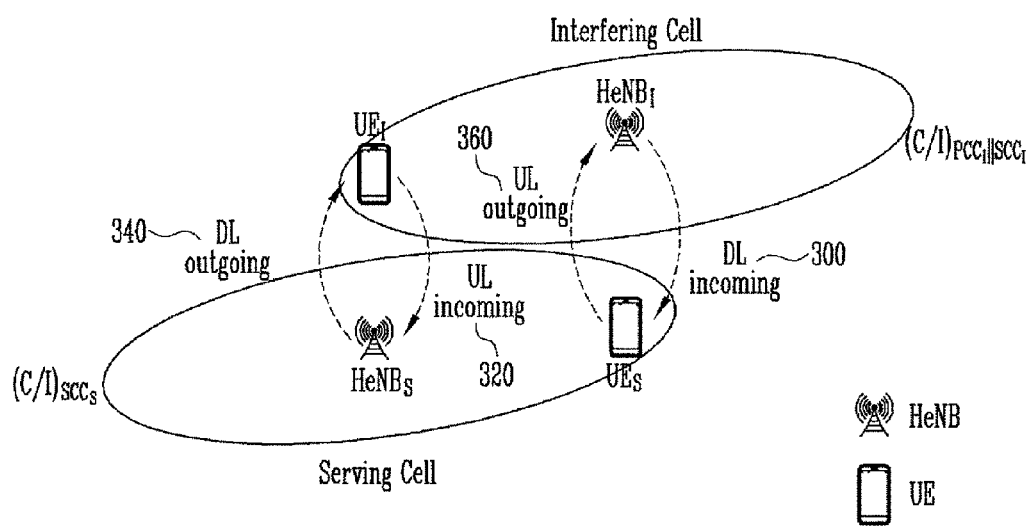
FIG. 3 is a conceptual view of an interference that may exist between a serving cell and an interfering cell.

FIG. 3 is a conceptual view of an interference that may exist between a serving cell and an interfering cell.

FIG. 3 illustrates four types of interference paths that may occur between a serving cell and adjacent interfering cell(s).

Referring to FIG. 3, interferences may be classified into incoming interferences that come into a serving cell and outgoing interferences that go out from the serving cell.

The interferences that come into the serving cell may be classified again into DL (downlink) interferences 300 that come from a base station (HeNB(HeNB$_I$)) of an interfering cell towards a User Equipment (UE$_S$) of the serving cell and UL (uplink) interferences 320 that come from a User Equipment (UE$_I$) of the interfering cell towards a base station (HeNB(HeNB$_S$)) of the serving cell.

The path from a base station of an interfering cell to a User Equipment of a serving cell may be called a first path, and the path from a User Equipment of the interfering cell to a base station of the serving cell may be called a second path.

Furthermore, interferences that go out from the serving cell may be classified into DL interferences 340 that come from a base station (HeNB$_S$) of the serving cell towards a User Equipment (UE$_I$) of an interfering cell and UL interferences 360 that come from a User Equipment (UE$_S$) of the serving cell towards a base station (HeNB$_I$) of the interfering cell.

The path from a base station of the serving cell to a User Equipment of an interfering cell may be called a third path, and the path from a User Equipment of the serving cell to a base station of the interfering cell may be called a fourth path.

The algorithm for determining an SCC (secondary component carrier), that is a frequency band to be carrier aggregated, may calculate CIR (committed information rate) margins regarding the four types of interference paths illustrated in FIG. 3, and may only determine whether or not a CIR margin is a negative number. If any of the first to fourth paths have a negative CIR margin, the subject component carrier may not be used as a SCC.

Math formula 1 below shows calculating CIR margins for the four types of interference paths.

$$\Delta_1(c) = (C/I)_{in,UE_S} - (C/I)_{SCC_S}$$

$$\Delta_2(c) = (C/I)_{in,HeNB_S} - (C/I)_{SCC_S}$$

$$\Delta_3(c) = (C/I)_{out,UE_I} - (C/I)_{PCC_S \| SCC_I}$$

$$\Delta_4(c) = (C/I)_{in,HeNB_I} - (C/I)_{PCC_S \| SCC_I} \qquad \text{<Math formula 1>}$$

In math formula 1, $\Delta_1(c)$ is a first CIR margin for a DL interference 300 that comes from a base station (HeNB (HeNB$_I$)) of an interfering cell towards a User Equipment (UE$_S$) of a serving cell from among the interferences that come into the serving cell. That is, the first CIR margin is the result of subtracting the size of a minimum target SINR ($(C/I)_{SCC_S}$) required to be used as an SCC in the serving cell from the size of SINR ($(C/I)_{in,UE_S}$) of the UL interference 300 that comes from the base station (HeNB(HeNB$_I$)) of the interfering cell towards the User Equipment (UE$_S$) of the serving cell.

$\Delta_2(c)$ is a second CIR margin for an UL interference 320 that comes from a User Equipment (UE$_I$) of an interfering cell towards a base station (HeNB(HeNB$_S$)) of the serving cell of among the interferences that come into the serving cell. That is, the second CIR margin is the result of subtracting the size of a minimum target SINR ($(C/I)_{SCC_S}$) required to be used as an SCC in the serving cell from the size of SINR $(C/I)_{in,HeNB_S}$ of the UL interference 320 that comes from the User) Equipment ($UE_I$) of the interfering cell towards the base station (HeNB($HeNB_S$)) of the serving cell.

$\Delta_3(c)$ is a third CIR margin for an UL interference 340 that comes from a base station ($HeNB_S$) of a serving cell towards a User Equipment ($UE_I$) of an interfering cell of among the interferences that go out from the serving cell. The third CIR margin is the result of subtracting (($C/I)_{PCC_I\|SCC_I}$) from the size of SINR (($C/I)_{out,UE_I}$) of the UL interference 340 that comes from the base station ($HeNB_S$) of the serving cell towards the User Equipment ($UE_I$) of the interfering cell. $(C/I)_{PCC_I\|SCC_I}$ is a value that may vary depending on the usage of the subject component carrier in the interfering cell, and when the component carrier of the serving cell is used in the interfering cell as a PCC (primary component carrier), $(C/I)_{PCC_I}$ may be used, but when the component carrier of the serving cell is used in the interfering cell as an SCC, $(C/I)_{SCC_I}$ may be used.

$\Delta_4(c)$ is a fourth CIR margin for an UL interference 360 that comes from a User Equipment ($UE_S$) of a serving cell towards a base station ($HeNB_I$) of an interfering cell of among the interferences that go out from the serving cell. The fourth CIR margin is the result of subtracting (($C/I)_{PCC_I\|SCC_I}$) from the size of SINR (($C/I)_{out,HeNB_I}$) of the UL interference 360 that goes out from the User Equipment ($UE_S$) of the serving cell towards the base station ($HeNB_I$) of the interfering cell. $(C/I)_{PCC_I\|SCC_I}$ is a value that may vary depending on the usage of the subject component carrier in the interfering cell, and when the component carrier of the serving cell is used in the interfering cell as a PCC (primary component carrier), $(C/I)_{PCC_I}$ may be used, but when the component carrier of the serving cell is used in the interfering cell as an SCC, $(C/I)_{SCC_I}$ may be used.

FIG. 3 illustrates an embodiment of an interference substance. According to an embodiment of the present invention, an additional interference substance may be further considered depending on circumstances. For example, if an interference substance that occurs between $UE_S$ and $UE_I$ is big enough not to be disregarded, the interference substance may be further considered depending on circumstances. For example, a fifth path interference (a type of outgoing UL interference) that $UE_S$ affects $UE_I$, and a sixth path interference (a type of incoming UL interference) that $US_I$ affects $UE_S$ may be further considered.

In conventional carrier aggregation methods, the carriers aggregated would be homogeneous carriers, and thus the interferences that two cells affect each other would have the same characteristics. For example, only the interferences between homogeneous carrier bands such as the interference that a user of a high priority affects another user of a high priority and the interference that a user of a low priority affects another user of a low priority were considered.

However, in the case of aggregating heterogeneous carriers, the interferences between two cells may have different characteristics. For example, the interferences that occur between frequency bands such as when a user of a high priority such as LTE band affects a user of IEEE 802.11 using ISM band may become a problem. Therefore, in an embodiment of the present invention, it may be necessary to comprehensively consider not only the quantity of interferences but also the quality (or characteristics) of the interferences when selecting a component carrier in an environment for performing carrier aggregation. Hereinbelow, a method for selecting a frequency band to be used in heterogeneous carrier aggregation including calculating interferences in a frequency band, and selecting a frequency band to be aggregated according to an embodiment of the present invention will be explained.

According to an embodiment of the present invention, it is possible to select a component carrier to be carrier aggregated based on an accumulated value calculated by applying a weighting factor.

According to an embodiment of the present invention, in selecting a component carrier to be carrier aggregated, it is possible to apply a weighting factor to an accumulated interference or CIR margin to which interferences occurred through a plurality of paths such as the first path to fourth path have been accumulated. The term 'accumulated value' may be used to include both the accumulated interference and accumulated margin.

Math formula 2 is for calculating an accumulated value, A(c), based on a CIR margin regarding component carrier c.

$$A(c) = w_1 \Delta I_{in,UE_S} + w_2 \Delta I_{in,HeNB_S} + w_3 \Delta I_{out,UE_I} + w_4 \Delta I_{out,HeNB_I} \quad \text{<Math formula 2>}$$

Math formula 2 represents an accumulated value calculated by applying a weighting factor to a CIR margin regarding each of the first to fourth paths. $w_1 \sim w_4$ are weighting factors to be applied to the first to fourth paths described with reference to FIG. 3. Math formula 2 is merely an example, and thus interference between User Equipments located in each cell may be further considered.

Math formula 3 may be used to determine a component carrier to be carrier aggregated with a PCC of the serving cell from among a plurality of component carriers.

$$c_{max} = \max A(c) \quad \text{<Math formula 3>}$$

Math formula 3 represents using a component carrier having the largest accumulated value (accumulated margin) in carrier aggregation, when using a CIR margin to determine an interference substance for each path.

If A(c) is a formula generated based on interferences and not a CIR margin as in math formula 2, a component carrier to be carrier aggregated from among a plurality of component carriers may be determined by math formula 4 below.

$$c_{min} = \min A(c) \quad \text{<Math formula 4>}$$

Referring to math formula 4, if A(c) is calculated based on an interference itself, a component carrier having the smallest accumulated value (accumulated interference) may be used in carrier aggregation.

Figure 4:
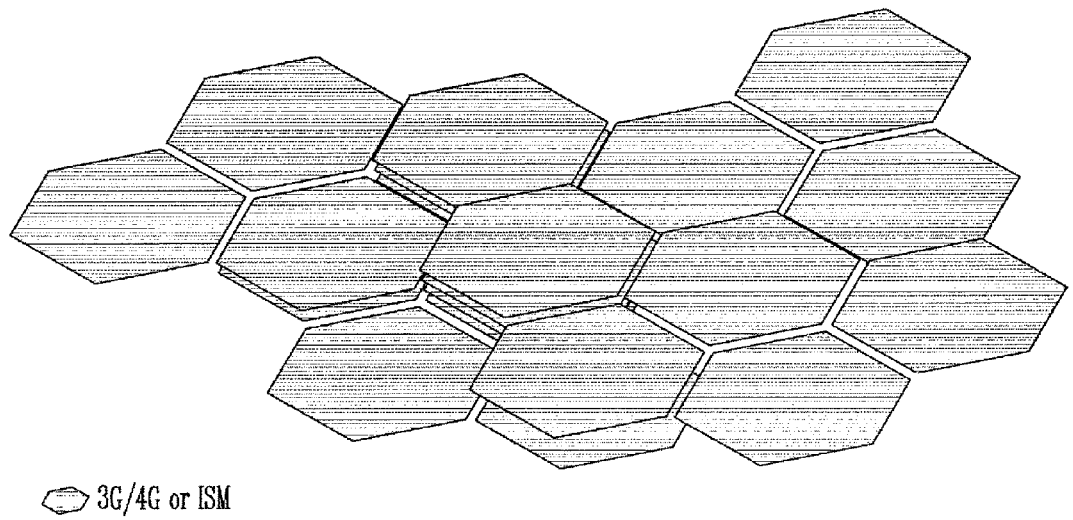
FIG. 4 is a conceptual view of aggregating carriers using homogeneous carriers in an interfering cell adjacent to a serving cell according to an embodiment of the present invention.

FIG. 4 is a conceptual view of aggregating carriers using homogeneous carriers in an interfering cell adjacent to a serving cell according to an embodiment of the present invention.

Referring to FIG. 4, since carriers that give interference and carriers that receive interference from a serving cell 400 are all homogeneous, weighting factors to be applied to calculate an accumulated interference may all be the same value. That is, when the carriers are homogeneous, homogeneous carriers to be carrier aggregated may be determined by calculating an accumulated interference without considering the weighting factors.

Figure 5A:
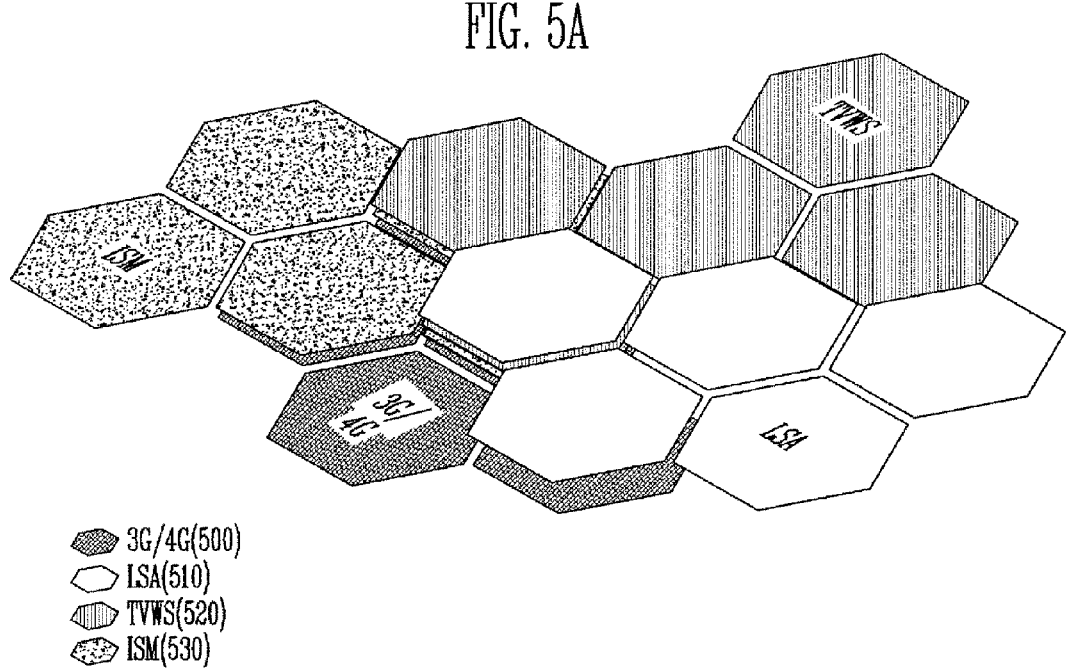
FIG. 5a and FIG. 5b are conceptual view of aggregating carriers using heterogeneous carriers in an interfering cell adjacent to a serving cell according to an embodiment of the present invention.
Figure 5B:
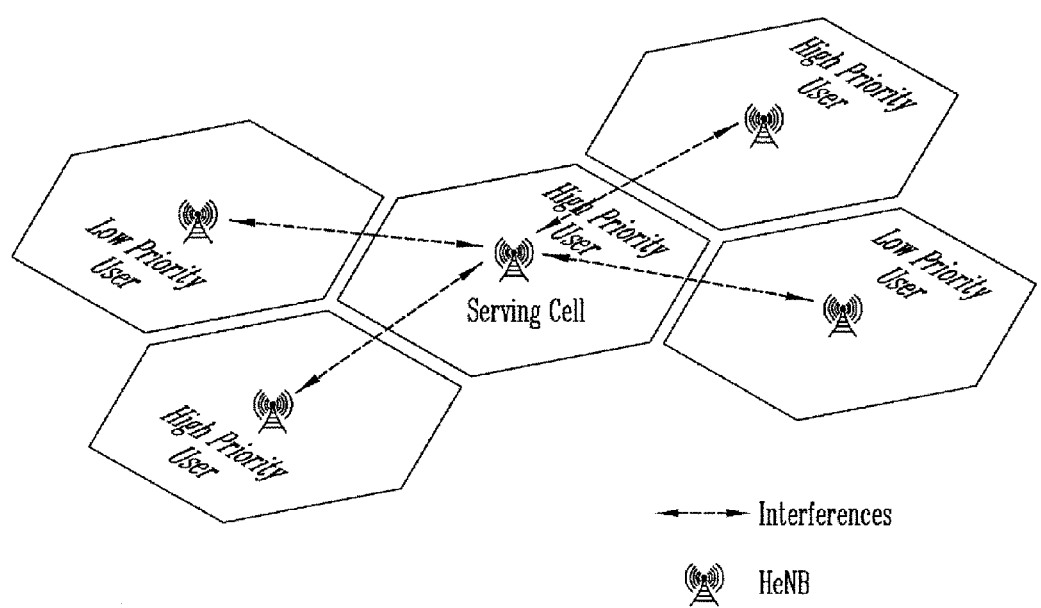

FIG. 5 is a conceptual view of aggregating carriers using heterogeneous carriers in an interfering cell adjacent to a serving cell according to an embodiment of the present invention.

Referring to FIG. 5, there may be a cell adjacent to a serving cell that performs service based on a carrier homogeneous to the serving cell, and there may be a cell adjacent to the serving that provides service based on a carrier heterogeneous to the serving cell. For example, the serving cell may be embodied as a high priority 500 based on LTE, LTE-A, while an adjacent cell is embodied either as a high priority 500 based on LIE, LTE-A, that is a homogeneous cell, or embodied as ISM band 530, TVWS band 520, or LSA band 510 that are heterogeneous carriers.

In a case of performing carrier aggregation in a serving cell based on a heterogeneous carrier, it is possible to determine a weighting factor for calculating an accumulated interference taking into consideration the relationship between a carrier that gives interference and a carrier that receives interference. When calculating a weighting factor, an incoming interference that comes into a serving cell and an outgoing interference that goes out from the serving cell may be calculated separately.

An accumulated interference may be calculated to determine an accumulated interference for determining a heterogeneous carrier to be used in carrier aggregation. When aggregating heterogeneous carriers, a weighting factor may be set differently in consideration of the effect of the interference that an apparatus operating in the serving cell gives or receives and the effect of the interference that an apparatus operating in an adjacent cell gives or receives.

For example, when calculating an accumulated interference, it is possible to have the effect of the interference that the apparatus of a high priority carrier (hereinafter referred to as high priority apparatus) receives to be reflected as a larger effect than the effect of the interference that the apparatus of a low priority carrier (hereinafter referred to as low priority apparatus) receives. Furthermore, when calculating an accumulated interference, it is possible have the effect of the interference that the low priority apparatus gives to be reflected as a larger effect than the effect of the interference that the high priority apparatus gives.

That is, the weighted factors may be determined such that a largest weighted value is applied to an interference that a low priority apparatus gives to a high priority apparatus, followed by an interference that a high priority apparatus gives to a high priority apparatus, followed by an interference that a low priority apparatus gives to a low priority apparatus, followed by an interference that a high priority apparatus gives to a low priority apparatus.

Table 1 below shows the size of interferences between a high priority apparatus and a low priority apparatus.

Figure 6:
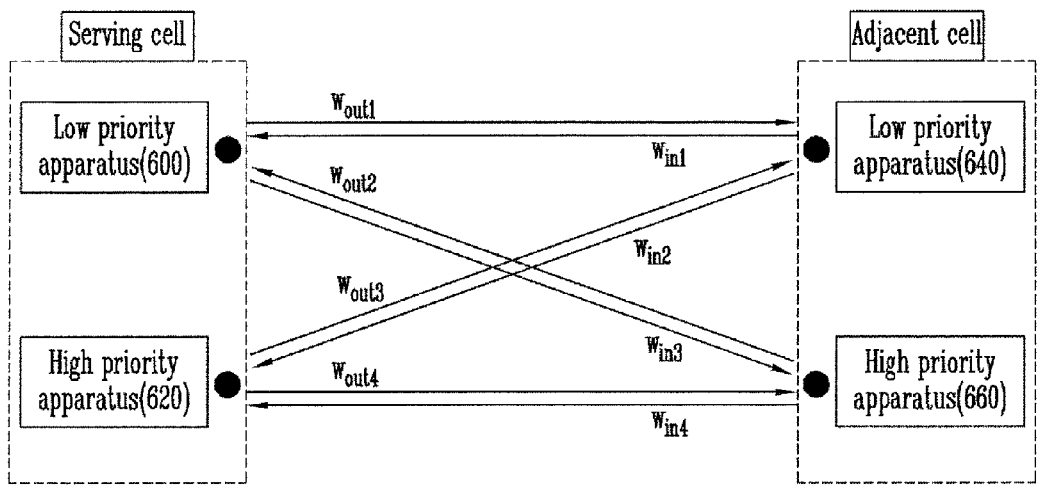
FIG. 6 is a conceptual view of a weighting factor determining method according to an embodiment of the present invention.

FIG. 6 illustrates a method for determining a weighting factor when performing carrier aggregation based on a heterogeneous carrier.

Referring to FIG. 6, an accumulated interference may be calculated separately for incoming interferences that come into a serving cell from an adjacent cell and for outgoing interferences that go out from the serving cell to an adjacent cell. Furthermore, the accumulated interference may be calculated in consideration of the weighted value for interferences that come from an adjacent cell into a serving cell, and the weighted value for interferences that go out from the serving cell to the adjacent cell. The weighted value for an interference that comes from an adjacent cell into a serving cell may be referred to as $w_{in}$, while the weighted value for an interference that goes out from a serving cell to an adjacent cell may be referred to as $w_{out}$.

Based on the interferences coming into a serving cell, the weighted value to be applied to an interference that a low priority apparatus 600 of the serving cell receives from a low priority apparatus 640 of an adjacent cell may be referred to as $w_{in1}$, the weighted value to be applied to an interference that a high priority apparatus 620 of the serving cell receives from a low priority apparatus 640 of an adjacent cell may be referred to as $w_{in2}$, the weighted value to be applied to an interference that a low priority apparatus 600 of the serving cell receives from a high priority apparatus 660 of an adjacent cell may be referred to as $w_{in3}$, and the weighted value to be applied to an interference that a high priority apparatus 620 the serving cell receives from a high priority apparatus 660 of an adjacent cell may be referred to as $w_{in4}$.

Based on the interferences going out from a serving cell, the weighted value to be applied to an interference that a low priority apparatus 600 of the serving cell gives to a low priority apparatus 640 of an adjacent cell may be referred to as $w_{out1}$, the weighted value to be applied to an interference that a low priority apparatus 600 of the serving cell gives to a high priority apparatus 660 of an adjacent cell may be referred to as $w_{out2}$, the weighted value to be applied to an interference that a high priority apparatus 620 of the serving cell gives to a low priority apparatus 640 of an adjacent cell may be referred to as $w_{out3}$, and the weighted value to be applied to an interference that a high priority apparatus 620

TABLE 1

| Incumbent Access | Priority Access | General Access |
|---|---|---|
| LSA IU (e.g., Satellite, Radar) | Larger Weighting → High Priority ← Smallest Weighting → Low Priority ← Largest Weighting | Smaller Weighting |

That is, referring to table 1, to list the interferences in the order of the size of weighting factors, the weighted factors may be determined such that a largest weighted value is applied to an interference that a low priority apparatus gives to a high priority apparatus, followed by an interference that a high priority apparatus gives to a high priority apparatus, followed by an interference that a low priority apparatus gives to a low priority apparatus, followed by an interference that a high priority apparatus gives to a low priority apparatus.

FIG. 6 is a conceptual view of a weighting factor determining method according to an embodiment of the present invention.

of the serving cell gives to a high priority apparatus 640 of an adjacent cell may be referred to as $w_{out4}$.

The size of an interference that comes from an adjacent cell into a serving cell, $w_{in}$, and the size of an interference that goes out from the serving cell to an adjacent cell, $w_{out}$, may have a relationship as in math formula 5 below.

$$w_{in2} \geq w_{in4} \gg w_{in1} \geq w_{in3}$$

$$w_{out2} \geq w_{out4} \gg w_{out1} \geq w_{out3} \qquad \text{<Math formula 5>}$$

Based on the size of weighted values set as aforementioned, it is possible to calculate an accumulated interference and determine a heterogeneous carrier to be carrier aggregated.

When using such a method, since an accumulated interference is used in a component carrier selection algorithm, it is possible to perform carrier aggregation in comprehensive consideration of the total amount of interferences coming into a serving cell and interferences going out to an adjacent cell.

Furthermore, according to the present invention, by applying a weighting factor based on the usage circumstance of heterogeneous carriers of a serving cell and an adjacent interfering cell, it is possible to perform carrier aggregation in consideration of not only the quantity of interference that used to be considered in conventional methods but also the quality (or characteristics) of interference.

Figure 7:
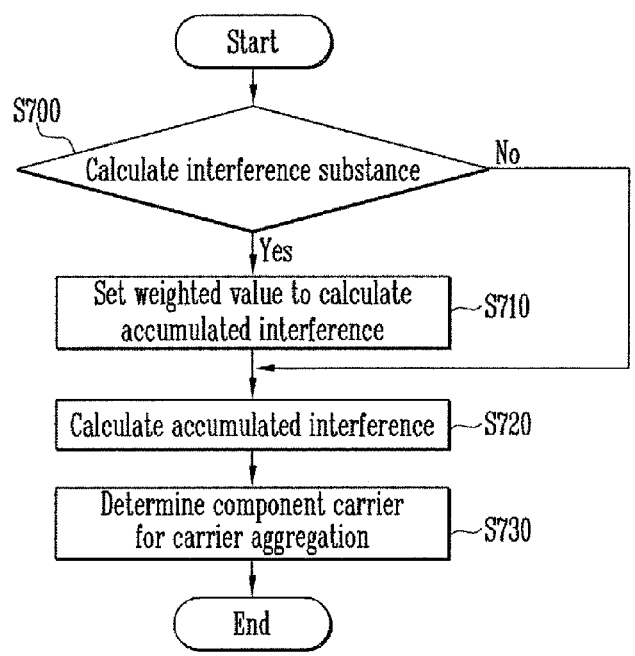
FIG. 7 is a conceptual view of a method for determining a component carrier to be used in carrier aggregation according to an embodiment of the present invention.

FIG. 7 is a conceptual view of a method for determining a component carrier to perform carrier aggregation with according to an embodiment of the present invention.

Referring to FIG. 7, an interference substance may be calculated (S700).

As mentioned above, at S700, an interference substance may be calculated for each interference path.

For example, an interference may be calculated for a first path that comes out from a base station of an interfering cell towards a User Equipment of a serving cell, a second path that comes from the User Equipment of the serving cell towards a base station of the serving cell, a third path that comes from the base station of the serving cell towards a User Equipment of the interfering cell, and a fourth path that comes from the User Equipment of the serving cell towards the base station of the interfering cell. Depending on the size of the interferences, interferences for further paths besides the first to fourth paths may be calculated.

A weighted value for calculating an accumulated interference may be determined (S720).

An accumulated interference may be calculated based on different weighted values depending on whether or not a component carrier to be carrier aggregated is a heterogeneous carrier. For example, when performing carrier aggregation based on homogeneous carriers, a plurality of weighted values for calculating an accumulated interference may be determined as the same value. That is, when component carriers to be carrier aggregated are homogeneous carriers, weighted values to be used for calculating an accumulated interference may be set to a same value and then used. When component carriers to be carrier aggregated are homogeneous carriers, an accumulated interference may be calculated based on an assumption that the effects of the interferences of the component carriers are the same.

On the other hand, when performing a carrier aggregation based on heterogeneous carriers, a plurality of weighted values for calculating an accumulated interference may be set to different values and be used. As aforementioned with reference to FIG. 6, weighted values to be used for calculating an accumulated interference for selecting a component carrier when performing carrier aggregation based on heterogeneous carriers may be set differently in consideration of the effect that an apparatus operating in a serving cell gives or receives and the effect that an apparatus operating in an adjacent cell gives or receives.

An accumulated interference may be calculated (S720).

The accumulated interference may be calculated based on the weighted value determined at S710. The accumulated interference may be calculated separately for incoming interferences coming from an adjacent cell into a serving cell and for outgoing interferences going out from the serving cell to the adjacent cell. Furthermore, the accumulated interference may be calculated in consideration of the weighted value for the interferences coming from the adjacent cell into the serving cell and the weighted value for the interferences going out from the serving cell to the adjacent cell.

A component carrier to be carrier aggregated may be determined based on the accumulated interference calculated (S740).

A homogeneous carrier or heterogeneous carrier to be carrier aggregated may be determined based on the accumulated interference calculated. A homogeneous carrier or heterogeneous carrier to be carrier aggregated may be determined based on the accumulated interference calculated for a plurality of homogeneous carrier bands or a plurality of heterogeneous carrier bands.

Figure 8:
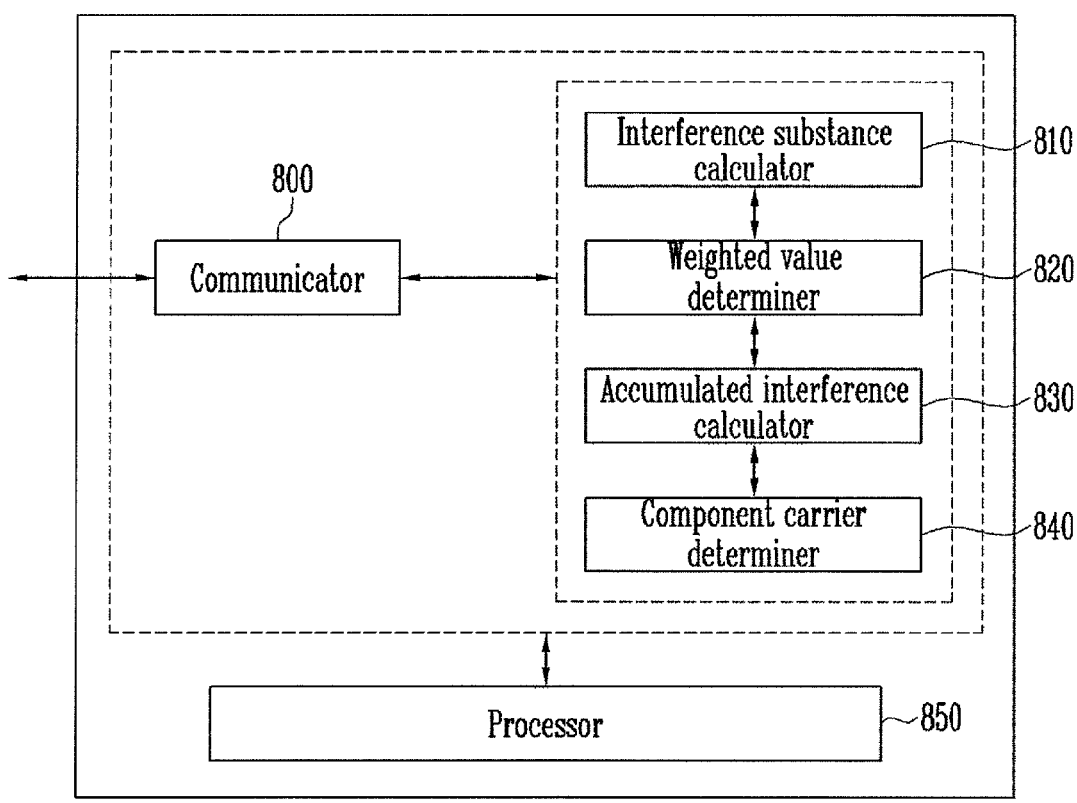
FIG. 8 is a conceptual view of an apparatus for determining a component carrier to be used in carrier aggregation according to an embodiment of the present invention.

FIG. 8 is a conceptual view of an apparatus for determining a component carrier to be used in carrier aggregation according to an embodiment of the present invention.

FIG. 8 is based on an assumption that a base station determines a component carrier to be carrier aggregated and performs carrier aggregation.

The base station may include a communicator 800, interference substance calculator 810, weighted value determiner 820, accumulated interference calculator 830, component carrier determiner 840, and processor 850.

The communicator 800 may receive interference information or CIR margin information for determining a component carrier to be carrier aggregated.

The interference substance calculator 810 may be embodied to calculate an interference substance regarding an interference path.

The weighted value determiner 820 may determine a weighted value for calculating an accumulated interference. For example, as aforementioned with reference to FIG. 6, a weighted value determined by the weighted value determiner 820 may vary depending on whether a component carrier to be carrier aggregated is a homogeneous carrier or a heterogeneous carrier according to the determination by the component carrier determiner.

The accumulated interference calculator 830 may calculate an accumulated interference based on the weighted value determined by the weighted value determiner 820. An accumulated interference for an incoming interference that comes from an adjacent cell and goes into a serving cell and an accumulated interference for an outgoing interference that comes from the serving cell and goes into an adjacent cell may be calculated separately. Furthermore, an accumulated interference may be calculated in consideration of a weighted value regarding an interference that comes out from an adjacent cell and goes into a serving cell, and a weighted value regarding an interference that comes out from a serving cell and goes into an adjacent cell.

The component carrier determiner 840 may determine a component carrier to be carrier aggregated in consideration of information on the accumulated interference accumulated.

The processor 850 may control operations of the communicator 800, interference substance calculator 810, weighted value determiner 820, accumulated interference calculator 830, and component carrier determiner 840.

In the drawings and specification, there have been disclosed typical exemplary embodiments of the invention, and although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A carrier aggregation method comprising:
calculating interferences regarding a plurality of interference paths between an adjacent cell and serving cell;
determining weighted values for the plurality of interference paths in the serving cell;
calculating an accumulated value (accumulated margin or accumulated interference) regarding the plurality of interference paths based on the weighted values in the serving cell;
determining a component carrier to be used in the carrier aggregation based on the accumulated value calculated in the serving cell; and
performing the carrier aggregation based on the component carrier determined,
wherein the weighted value are determined such that a largest weighted value is applied to an interference that a low priority apparatus gives to a high priority apparatus, followed by an interference that a high priority apparatus gives to a high priority apparatus, followed by an interference that a low priority apparatus gives to a low priority apparatus, followed by an interference that a high priority apparatus gives to a low priority apparatus.

2. The method according to claim 1,
wherein the weighted values are determined according to math formula:

$$w_{in2} \geq w_{in4} \geq w_{in1} \geq w_{in3},$$

$w_{in1}$ being a weighted value to be applied to an interference that a low priority apparatus of the serving cell receives from the low priority apparatus of the adjacent cell,
$w_{in2}$ being a weighted value to be applied to an interference that a high priority apparatus of the serving cell receives from the low priority apparatus of the adjacent cell,
$w_{in3}$ being a weighted value to be applied to an interference that a low priority apparatus of the serving cell receives from the high priority apparatus of the adjacent cell, and
$w_{in4}$ being a weighted value to be applied to an interference that a high priority apparatus of the serving cell receives from the high priority apparatus of the adjacent cell.

3. The method according to claim 2,
wherein sizes of the weighted values are determined according to math formula:

$$w_{out2} \geq w_{out4} \geq w_{out1} \geq w_{out3},$$

$w_{out1}$ being a weighted value to be applied to an interference that the low priority apparatus of the serving cell receives from the low priority apparatus of the adjacent cell,
$w_{out2}$ being a weighted value to be applied to an interference that the low priority apparatus of the serving cell receives from the high priority apparatus of the adjacent cell,
$w_{out3}$ being a weighted value to be applied to an interference that the high priority apparatus of the serving cell receives from the low priority apparatus of the adjacent cell, and
$w_{out4}$ being a weighted value to be applied to an interference that the high priority apparatus of the serving cell receives from the high priority apparatus of the adjacent cell.

4. A base station configured to perform carrier aggregation, the base station comprising:
an interference substance calculator configured to calculate interferences regarding a plurality of interferences paths between an adjacent cell and serving cell;
a weighted value determiner configured to determine weighted values regarding the plurality of interference paths based on priorities of apparatuses;
an accumulated value calculator configured to accumulate the interferences regarding the plurality of interference paths based on the weighted values and to calculate an accumulated value (accumulated margin or accumulated interference);
a component carrier determiner configured to determine a component carrier to be used in the carrier aggregation based on the accumulated value; and
a processor configured to perform the carrier aggregation based on the component carrier determined,
wherein the weighted values are determined such that a largest weighted value is applied to an interference that a low priority apparatus gives to a high priority apparatus, followed by an interference that a high priority apparatus gives to a high priority apparatus, followed by an interference that a low priority apparatus gives to a low priority apparatus followed by an interference that a high priority apparatus gives to a low priority apparatus.

5. The base station according to claim 4,
wherein sizes of the weighted values are determined according to math formula:

$$W_{in2} \geq W_{in4} \geq W_{in1} \geq W_{in3},$$

$w_{in1}$ being a weighted value to be applied to an interference that the low priority apparatus of the serving cell gives to the low priority apparatus of the adjacent cell,
$w_{in2}$ being a weighted value to be applied to an interference that the high priority apparatus of the serving cell gives to the low priority apparatus of the adjacent cell,
$w_{in3}$ being a weighted value to be applied to an interference that the low priority apparatus of the serving cell gives to the high priority apparatus of the adjacent cell, and
$w_{in4}$ being a weighted value to be applied to an interference that the high priority apparatus of the serving cell gives to the high priority apparatus of the adjacent cell.

6. A base station according to claim 4,
wherein sizes of the weighted values are determined according to math formula:

$$w_{out2} \geq w_{out4} \geq w_{out1} \geq w_{out3},$$

$w_{out1}$ being a weighted value to be applied to an interference that the low priority apparatus of the serving cell gives to the low priority apparatus of the adjacent cell,
$w_{out2}$ being a weighted value to be applied to an interference that the low priority apparatus of the serving cell gives to the high priority apparatus of the adjacent cell,
$w_{out3}$ being a weighted value to be applied to an interference that the high priority apparatus of the serving cell gives to the low priority apparatus of the adjacent cell, and
$w_{out4}$ being a weighted value to be applied to an interference that the high priority apparatus of the serving cell gives to the high priority apparatus of the adjacent cell.

7. A carrier aggregation method comprising:
calculating interferences regarding a plurality of interference paths between an adjacent cell and serving cell;
determining weighted values for the plurality of interference paths in the serving cell based on whether the serving cell receives or gives an interference, whether an apparatus of the service cell is a high priority apparatus or low apparatus, and whether an apparatus of the adjacent cell is a high priority apparatus or low apparatus;
calculating and accumulated value (accumulated margin or accumulated interference ) regarding the plurality of interference paths based on the weighted values in the serving cell;
determining a component to be used in the carrier aggregation based on the accumulated value calculated in the serving cell; and
performing the carrier aggregation based on the component carrier determined.

8. The method according to claim 7,
wherein the weighted values are determined such that a largest weight value is applied to an interference that a low priority apparatus gives to a high priority apparatus, followed by an interference that a high priority apparatus gives to a high priority apparatus, followed by an interference that a low priority apparatus gives to a low priority apparatus, followed by an interference that a high priority apparatus gives to a low priority apparatus.

9. The method according to claim 8,
wherein sizes of the weighted values are deter mined according to math formula:

$$w_{in2} \geq w_{in4} \geq w_{in1} \geq w_{in3},$$

$w_{in1}$ being a weighted value to be applied to an interference that the low priority apparatus of the serving cell receives from the low priority apparatus of the adjacent cell,
$w_{in2}$ being a weighted value to be applied to an interference that the high priority apparatus of the serving cell receives from the low priority apparatus of the adjacent cell,
$w_{in3}$ being a weighted value to be applied to an interference that the low priority apparatus of the serving cell receives from the high priority apparatus of the adjacent cell, and
$w_{in4}$ being a weighted value to be applied to an interference that the high priority apparatus of the serving cell receives from the high priority apparatus of the adjacent cell.

10. The method according to claim 8,
wherein sizes of the weighted values are determined according to the math formula:

$$w_{out2} \geq w_{out4} \geq w_{out1} \geq w_{out3},$$

$w_{out1}$ being a weighted value to be applied to an interference that the low priority apparatus of the serving cell gives to the low priority apparatus of the adjacent cell,
$w_{out2}$ being a weighted value to be applied to an interference that the low priority apparatus of the serving cell gives to the high priority apparatus of the adjacent cell,
$w_{out3}$ being a weighted value to be applied to an interference that the high priority apparatus of the serving cell gives to the low priority apparatus of the adjacent cell, and
$w_{out4}$ being a weighted value to be applied to an interference that the high priority apparatus of the serving cell gives to the high priority apparatus of the adjacent cell.

* * * * *